US008700906B2

(12) United States Patent
Kamara et al.

(10) Patent No.: US 8,700,906 B2
(45) Date of Patent: Apr. 15, 2014

(54) SECURE COMPUTING IN MULTI-TENANT DATA CENTERS

(75) Inventors: Seny Fakaba Kamara, Seattle, WA (US); Mariana P. Raykova, New York, NY (US)

(73) Assignee: Microsoft Corporation, Redmond, WA (US)

( * ) Notice: Subject to any disclaimer, the term of this patent is extended or adjusted under 35 U.S.C. 154(b) by 499 days.

(21) Appl. No.: 13/007,365

(22) Filed: Jan. 14, 2011

(65) Prior Publication Data

US 2012/0185946 A1 Jul. 19, 2012

(51) Int. Cl.
*G06F 21/00* (2013.01)
*H04L 9/00* (2006.01)

(52) U.S. Cl.
USPC ............................................ 713/180; 726/26

(58) Field of Classification Search
None
See application file for complete search history.

(56) References Cited

U.S. PATENT DOCUMENTS

| | | | | |
|---|---|---|---|---|
| 5,263,085 | A * | 11/1993 | Shamir | 380/30 |
| 6,772,339 | B1 | 8/2004 | Jakobsson et al. | |
| 2003/0126265 | A1 * | 7/2003 | Aziz et al. | 709/227 |
| 2004/0179686 | A1 | 9/2004 | Matsumura et al. | |
| 2005/0201555 | A1 | 9/2005 | Yen et al. | |
| 2007/0130130 | A1 | 6/2007 | Chan et al. | |
| 2008/0137857 | A1 | 6/2008 | Bellare et al. | |
| 2009/0187757 | A1 * | 7/2009 | Kerschbaum | 713/153 |
| 2010/0024036 | A1 * | 1/2010 | Morozov et al. | 726/26 |
| 2010/0132016 | A1 | 5/2010 | Ferris | |
| 2011/0202927 | A1 * | 8/2011 | Miloushev et al. | 718/104 |
| 2011/0289383 | A1 * | 11/2011 | Dhuse et al. | 714/763 |
| 2012/0002811 | A1 * | 1/2012 | Smart | 380/255 |
| 2012/0166576 | A1 * | 6/2012 | Orsini et al. | 709/217 |

FOREIGN PATENT DOCUMENTS

WO 2009025220 A1 2/2009

OTHER PUBLICATIONS

"Designing Secure Multi-Tenancy into Virtualized Data Centers", Retrieved from: <http://www.cisco.com/en/US/docs/solutions/Enterprise/Data_Center/Virtualization/securecldg.html> on Sep. 16, 2010, (Mar. 16, 2010), 52 pages.
"Secure Multi-Tenancy for Cloud Architecture with NetApp, Cisco, and VMware", Retrieved from: <http://www.netapp.com/us/technology/secure-multi-tenancy.html> on Sep. 16, 2010, (2010), 2 pages.
"Securing Multi-tenancy and Cloud Computing", *Altor White Paper*, Available at <http://www.altornetworks.com/wp-content/uploads/2010/06/Altor-SecuringMultiTenancyAndClouds_whitepaper. pdf>,(Jun. 2010), pp. 1-7.
Van Dijk, Marten et al., "On the Impossibility of Cryptography Alone for Privacy-Preserving Cloud Computing", *In Proceedings of HotSec 2010*, Available at <http://eprint.iacr.org/2010/305.pdf>,(2010), 8 pages.

(Continued)

*Primary Examiner* — Gilberto Barron, Jr.
*Assistant Examiner* — Abdulhakim Nobahar
(74) *Attorney, Agent, or Firm* — Dan Choi; Carole Boelitz; Micky Minhas

(57) ABSTRACT

This document describes techniques and apparatuses for secure computing in multi-tenant data centers. These techniques permit a client to delegate computation of a function to multiple physical computing devices without the client's information being vulnerable to exposure. The techniques prevent discovery of the client's information by a malicious entity even if that entity is a co-tenant on many of the same physical computing devices as the client.

18 Claims, 6 Drawing Sheets

(56) References Cited

OTHER PUBLICATIONS

Zhu, Huafei "Towards a Theory of Cloud Computing in the Protocol-Composition Framework", *Third International Symposium on Intelligent Technology and Security Informatics*, Available at <http://ieeexplore.ieee.org/stamp/stamp.jsp?tp=&arnumber=5453733>,(Apr. 22, 2010),pp. 758-762.

"International Search Report", Mailed Date—Aug. 31, 2012, Application No. PCT/US2012/021002, Filed Date—Jan. 12, 2012, pp. 9.

* cited by examiner

US 8,700,906 B2

SECURE COMPUTING IN MULTI-TENANT DATA CENTERS

BACKGROUND

Modern data centers are efficient, reliable, and can elastically respond to varying computational demands. These data centers, for example, can enable tens of thousands of individuals to browse the Internet or perform operations using extensive computational resources.

To meet these demands, modern data centers often use multi-tenancy techniques. Multi-tenancy techniques allocate virtual machines on a same physical machine, such as a same computer server. Thus, one client's virtual machine may be operating on a same physical machine as another client's virtual machine. When this happens, one client's information may be vulnerable to discovery by the other client.

In an attempt to address this problem, current techniques isolate virtual machines through a hypervisor or reduce use of multi-tenancy. These current techniques, however, are often inadequate to correct this vulnerability or reduce a modern data center's efficiency, reliability, or elasticity.

SUMMARY

This document describes techniques for secure computing in multi-tenant data centers. These techniques permit a client to delegate computation of a function to multiple physical computing devices without the client's information being vulnerable to exposure. The techniques prevent discovery of the client's information by a malicious entity even if that entity is a co-tenant on many of the same physical computing devices as the client.

This summary is provided to introduce simplified concepts for secure computing in multi-tenant data centers that is further described below in the Detailed Description. This summary is not intended to identify essential features of the claimed subject matter, nor is it intended for use in determining the scope of the claimed subject matter. Techniques and/or apparatuses for secure computing in multi-tenant data centers are also referred to herein separately or in conjunction as the "techniques" as permitted by the context.

BRIEF DESCRIPTION OF THE DRAWINGS

Embodiments for secure computing in multi-tenant data centers are described with reference to the following drawings. The same numbers are used throughout the drawings to reference like features and components.

DETAILED DESCRIPTION

Overview

This document describes techniques and apparatuses for secure computing in multi-tenant data centers. Consider a case where a client has nine virtual machines operating on nine computer servers in two data centers. The techniques prevent a malicious other client from discovering the client's information even if the malicious other client has virtual machines operating on most of these same nine computer servers.

This discussion proceeds to describe an example environment in which the techniques may operate, methods performable by the techniques, example implementations, and an example apparatus below.

Example Environment

Figure 1:
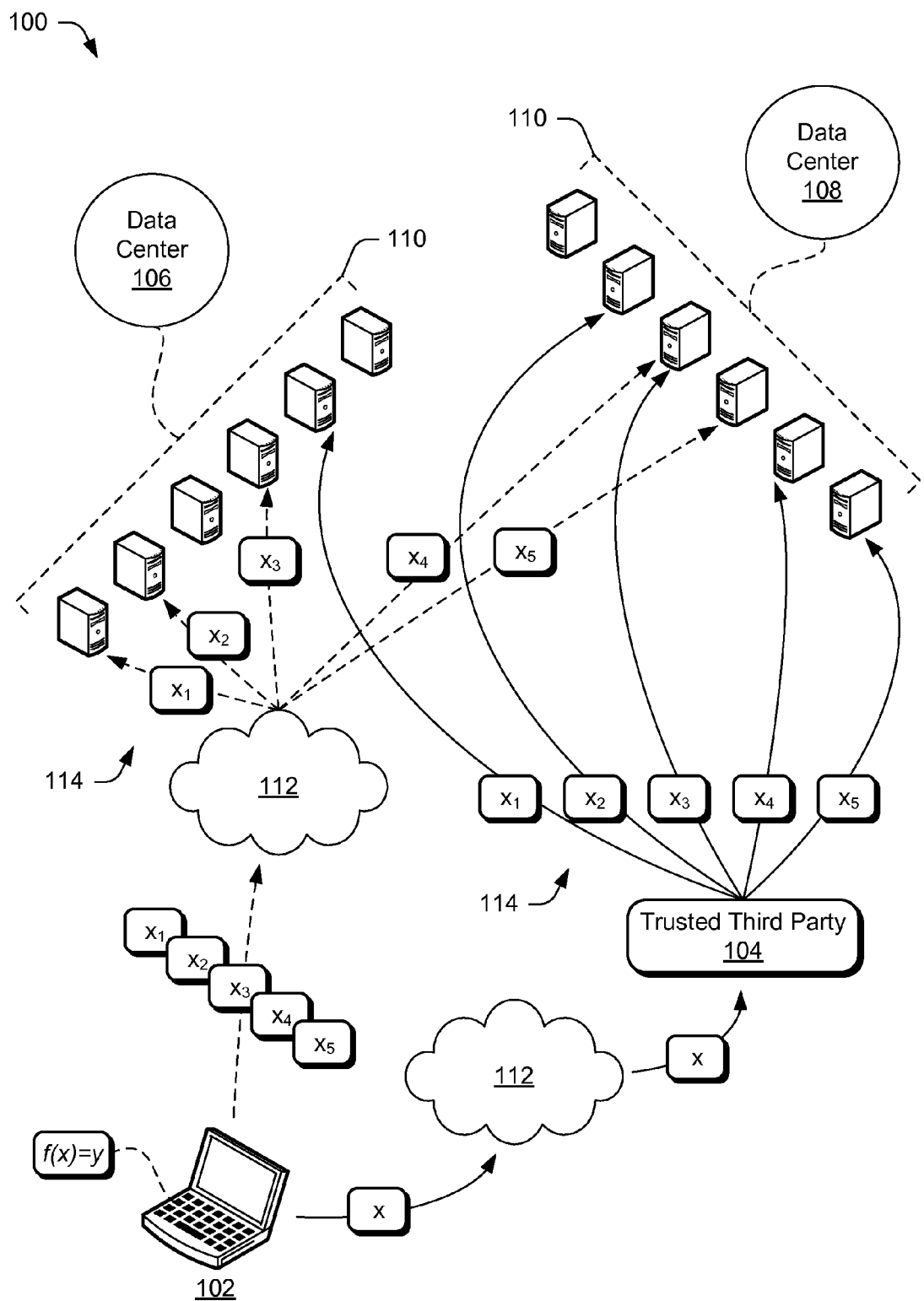
FIG. 1 illustrates an example environment in which techniques for secure computing in multi-tenant data centers can be implemented, the environment having a client device, a trusted third party, and data centers each having physical computing devices.

FIG. 1 illustrates an example environment 100 in which techniques for secure computing in multi-tenant data centers can be implemented, the environment having a client device 102, a trusted third party 104, data centers 106 and 108 each having physical computing devices 110, and a communication network 112. These physical computing devices 110 are shown as server computers in data centers, though other computing devices can also be used and do not need to be in a data center, such as disparate desktop computers (e.g., similar to the personal computer network performing the Search for Extra-Terrestrial Life, SETI). Communication network 112 may be or include the Internet, a local-area network, a wide-area network, a wireless network, a USB hub, a computer bus, or a combination of these, to name a just a few.

As shown in FIG. 1, client device 102 includes a function, $f(x)=y$, where the function is $f$, the input is x, and the output is y. The function can be any function performed on an input that results in output, such one or many operations of a computing application. As noted above, the techniques prevent information, such as client device 102's input, x, or output, y, from being discovered by a malicious other entity having some co-tenancy on physical computing devices 110 of one or more data centers 106, 108.

FIG. 1 illustrates two of many possible ways in which the techniques may operate. The first way shows client device 102 providing input x to trusted third party 104 through a communication network 112. Trusted third party 104 receives the input, splits the input into some number of shares 114 of the input (here five), and provides these to physical computing devices 110 of data centers 106 and 108. Trusted third party 104 can be integral with or disparate from data centers 106, 108, as described in more detail below.

FIG. 1 illustrates a second way in which the techniques may operate, the second way showing client device 102 splitting input x into five shares 114 and providing these shares directly to physical computing devices 106 and 108 through communication network 112. How the techniques perform these two ways, as well as how an output to the function is found, is detailed later herein.

Figure 2:
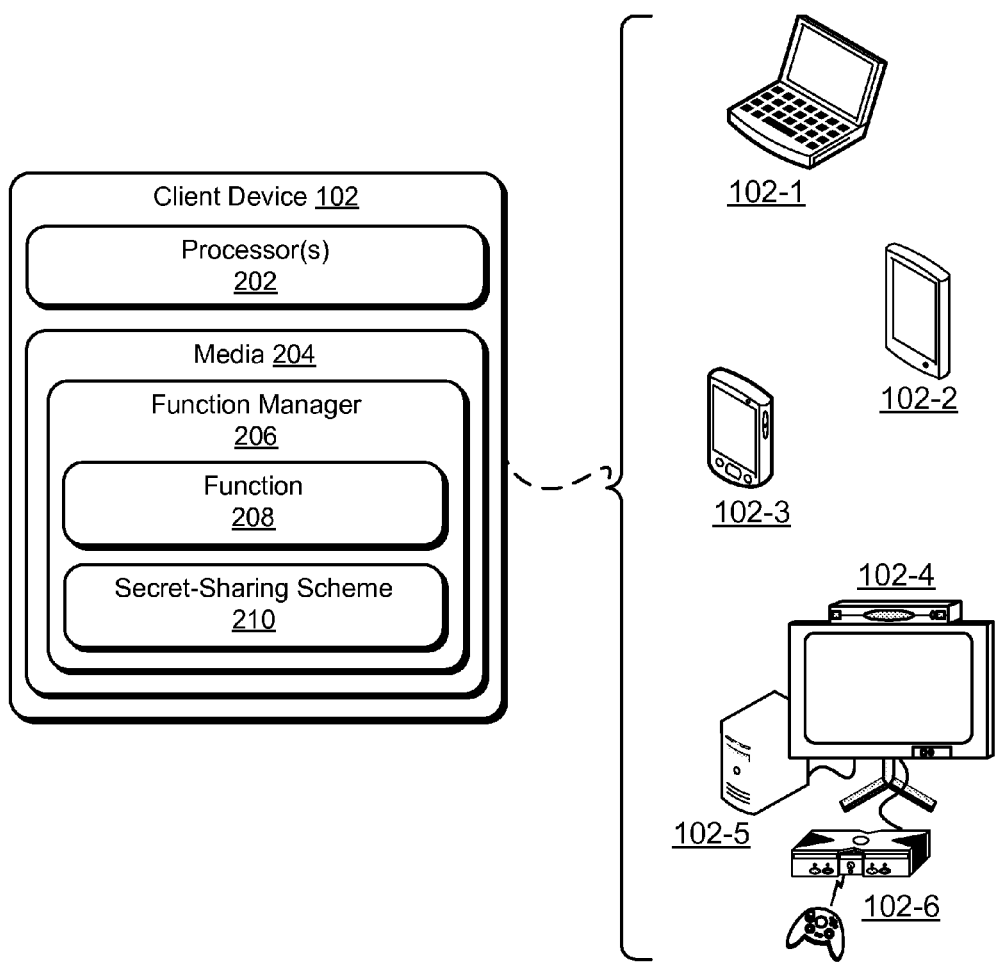
FIG. 2 illustrates an example embodiment of the client device of FIG. 1.

FIG. 2 is an illustration of an example embodiment of client device 102. Client device 102 includes one or more processors 202 and computer-readable media 204. Computer-readable media 202 includes function manager 206, function 208, and in some cases secret-sharing scheme 210.

Function manager 206 is capable of managing functions and/or communications between client device 102 and remote entities, such as trusted third party 104 and data centers 106, 108. As noted above, client device 102 may act in numerous ways, in some cases function manager 206 performs operations of secret-sharing scheme 210 effective to split input x into n number of input shares $(x_1, \ldots, x_n)$, provides these input shares, receives n number of output shares $(y_1, \ldots, y_n)$, and performs secret-sharing scheme 210 effective to recover output y from these output shares. In some other cases, client device 102, through function manager 206, provides input x and received output y (e.g., from trusted third party 104).

As shown in FIG. 2, client device 102 can be one or a combination of various computing devices, here illustrated with six examples: a laptop computer 102-1, a tablet computer 102-2, a smart phone 102-3, a set-top box 102-4, a desktop computer 102-5, or a gaming device 102-6, though other computing devices and systems, such as servers and netbooks, may also be used.

Figure 3:
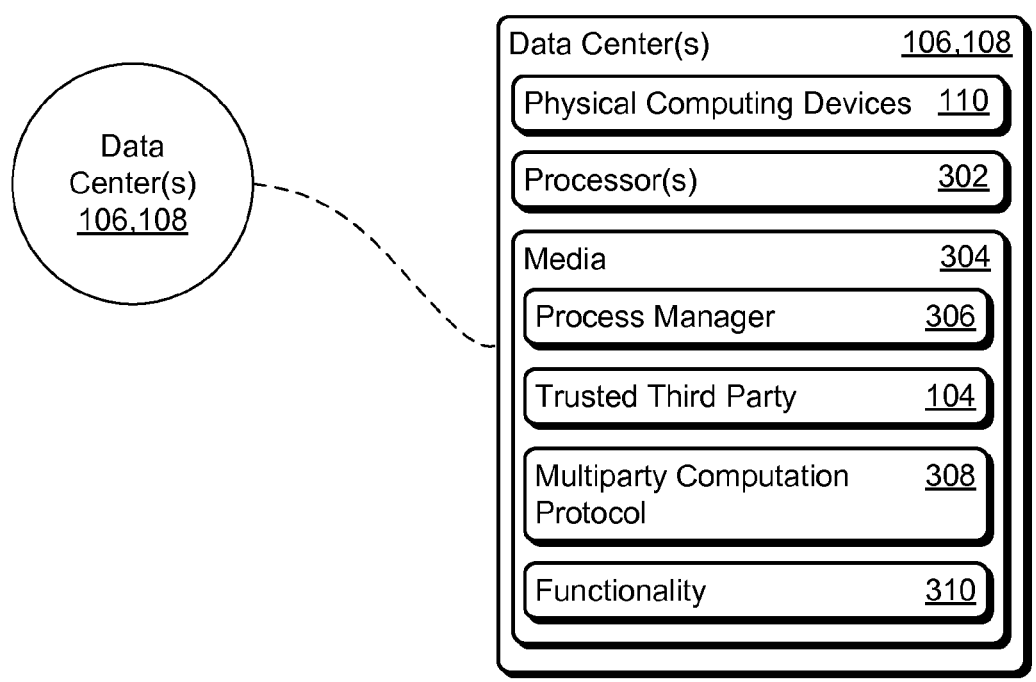
FIG. 3 illustrates an example embodiment of one of the data centers of FIG. 1.

FIG. 3 is an illustration of an example embodiment of data centers 106 and 108. Data centers 106 and 108 can be similar, identical, or different, though both at least include physical computing devices 110, one or more data center processor(s) 302, and data center computer-readable media 304. Media 304 includes a process manager 306, trusted third party 104, multiparty computation protocol 308, and a functionality 310. Process manager 306 may include, be included in, or integral with trusted third party 104 and/or a data center controller of one or more of data centers 106, 108. Trusted third part 104 is shown as a separate entity and included in data centers 106 and/or 108, though neither of these is required. Each of physical computing devices 110 includes processors and includes or has access to media, which may overlap with processor(s) 302 and/or media 304 (not shown).

Process manager 306 is capable of causing physical computing devices 110 (either in one or multiple data centers) to jointly execute multiparty computation protocol 308 effective to perform functionality 310. Each allocated physical computing device 110 does so based on its received input share $x_i$ and outputs its output share $y_i$. Functionality 310 is based on function f, noted above. Ways in which entities of FIGS. 1-3 act and interact are set forth in greater detail below.

Example Methods

Figure 4:
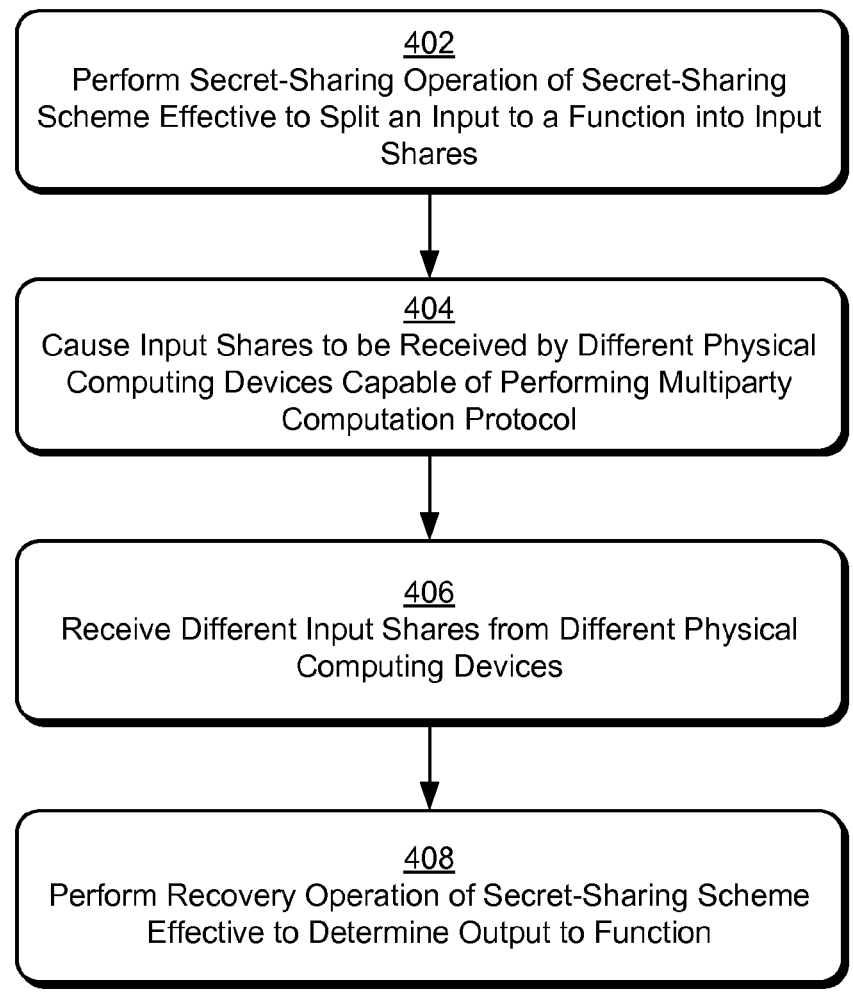
FIG. 4 illustrates an example method for secure computing in multi-tenant data centers that focuses on actions by a client device.

FIG. 4 depicts a method 400 for secure computing in multi-tenant data centers that focuses on actions by a client device. In portions of the following discussion reference may be made to environment 100 of FIG. 1 and as detailed in FIGS. 2 and 3, reference to which is made for example only.

Block 402 performs a secret-sharing operation of a secret-sharing scheme effective to split an input to a function into input shares, output shares of which are capable of being recovered by a recovery operation of the secret-sharing scheme. This secret-sharing operation can be performed by client device 102 or some other device, such as trusted third party 104. Method 400 focuses on performance by client device 102; later method(s) focus on performance by trusted third party 104.

By way of example, assume that client device 102 has input x to a function f and wants that function to be performed by one or more data centers effective to securely gain output y, without input x or output y being vulnerable to discovery by some entity potentially sharing co-tenancy on one or more physical computing devices 110 of these data centers. At block 402, therefore, function manager 206 has input x, function 208 (f(x)=y), and desires to gain y. To do so, function manager 206 performs, at block 402, a secret-sharing operation of secret-sharing scheme 210 on input x effective to split x into some n number of input shares $(x_i, \ldots, x_n)$.

Generally, the secret-sharing operation is effective to prevent recovery of the input to the function on any subset of the input shares. Thus, if a single input share is unknown to a malicious entity, that entity cannot recover the input. Recovery of an output to the function is also prevented if any one of the input shares or output shares is unknown to the malicious entity. As noted above, this permits co-tenancy of input shares and output shares on many same physical computing devices. Thus, if the secret-sharing operation is performed effective to split an input into 42 input shares, which are sent to 42 different physical computing devices, a malicious entity cannot know the input even if the malicious entity is able to determine 41 of the different input shares, such as by operating in co-tenancy with 41 of the 42 different physical computing devices. The techniques may assume that a likelihood of complete co-tenancy is so low as to be negligible, such as in cases where physical computing devices are assigned randomly from many tens of thousands of physical computing devices. In some other cases, the techniques insure that at least one of the different physical computing devices is not sharing co-tenancy with any potentially malicious entity.

Various particular types of secret-sharing schemes are contemplated herein, such as two polynomial-time algorithms, examples of which are provided in the Example Implementations section below.

Block 404 causes these input shares to be received by different physical computing devices. As noted above, these different physical computing devices are capable of jointly executing a multiparty computation protocol effective to evaluate a functionality associated with the function and the secret-sharing scheme. On completion, each of the different physical computing devices produces different output shares. Block 404 may cause these input shares to be received in various ways, one of which is to transmit each input share securely to each physical computing device or to a manager capable of doing so.

Continuing the ongoing example, function manager 206 transmits a number n of input shares $(x_1, \ldots, x_n)$ to process manager 306 of FIG. 3, which then passes each securely to different physical computing devices 110. Process manager 306 manages these devices 110 to jointly perform multiparty computation protocol 308 effective to perform functionality 310 to provide a number n of output shares $(y_1, \ldots, y_n)$. Ways in which this can be performed are detailed later below.

Block 406 receives different output shares from the different physical computing devices, either directly or through an intermediary. In the ongoing example, process manager 306 provides these output shares $(y_1, \ldots, y_n)$ to function manager 206 via communication network 112.

Block 408 performs a recovery operation of the secret-sharing scheme on the different output shares effective to determine an output to the function. Here process manager 306 performs a recovery operation corresponding to the secret-sharing operation of secret-sharing scheme 210 on output shares $(y_1, \ldots, y_n)$ effective to determine output y.

Figure 5:
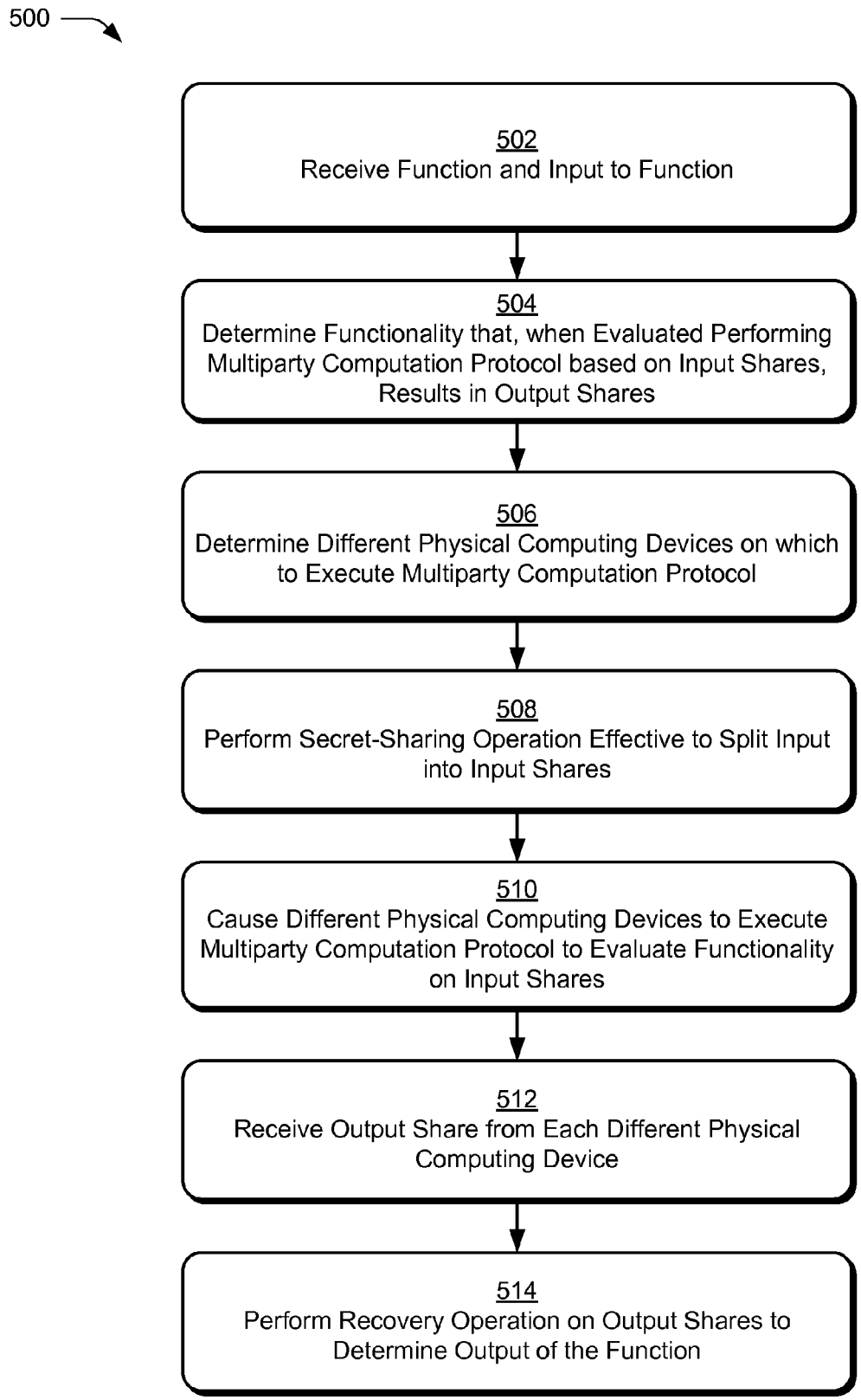
FIG. 5 illustrates an example method for secure computing in multi-tenant data centers that focuses on actions by a trusted third party and/or a data center process manager.

FIG. 5 depicts a method 500 for secure computing in multi-tenant data centers that focuses on actions by a trusted third party and/or a data center process manager. In portions of the following discussion reference may be made to environment 100 of FIG. 1 and as detailed in FIGS. 2 and 3, reference to which is made for example only.

Block 502 receives a function and an input to a function. This function, if performed on the input, results in an output. By way of example, assume that trusted third party 104 receives function 208 and input x from client device 102 through communication network 112.

Block 504 determines a functionality that, when evaluated by multiple entities jointly performing a multiparty computation protocol and each having an input share of an input to the function, results in output shares capable of being recovered to find an output to the function. By way of example, assume that trusted third party 104 receives function 208, namely $f(x)=y$, and determines functionality 310, here called $f'$, such that $$f'((x_1,r_1),\ldots,(x_n,r_n))=\text{Share}(f(\text{Recover}(x_1,\ldots,x_n),n;r_1\oplus\ldots\oplus r_n)$$

When the multiparty computation protocol 308 is performed, each of physical computing devices 110 that is executing protocol 308 on its respective input share $x_i$ returns a result of $y_i$. Note that these terms are described or defined in the Example Implementations section below.

Trusted third party 104 may determine this functionality 310 based on the secret-sharing scheme, the function, and the multiparty computation protocol, namely secret-sharing scheme 210, function 208, and multiparty computation protocol 308. In such a case, trusted third party 104 already has, or receives these from client device 102. While method 500 focuses on acts of trusted third party 104, block 504 may be performed by client device 102 instead, namely function manager 206. In such a case, function manager 206 has, determines, or receives multiparty computation protocol 308.

Block 506 determines different physical computing devices on which to execute a multiparty computation protocol. Block 506 is performed by some entity having control, direct or indirect, of different physical computing devices, such as a data center controller or multiple data center controllers. Here assume that trusted third party 104 works with process manager 306 on data center 106 or 108 effective to determine physical computing devices to execute multiparty computation protocol 308 on functionality 310 based on input shares.

Process manager 306 may determine which devices to use from many possible choices, such as using nine physical devices from 20,000 computer servers from which to choose. Process manager 306 may select these to make nearly impossible co-tenancy with a potentially malicious entity (e.g., any other client) through random selection or by determining or causing no other entity to share complete co-tenancy. Thus, in some cases process manager 306 dedicates one physical device of the nine to just client device 102 for a relevant period of time (which can be quite short). In some other cases, process manager 306 checks all of the nine selected physical computing devices to make sure that no potentially malicious entity is operating on all of those nine devices. In still other cases, process manager 306 determines a maximum number of physical computing devices on which a potentially malicious entity is capable of operating and allocates one additional number of devices.

Continuing the ongoing example, trusted third party 104 works with process manager 306 and determines five physical computing devices 110 of FIG. 1 to execute multiparty computation protocol 308. These five devices 110 are shown in FIG. 1 with four of the devices being on data center 108 and one being on data center 106.

Block 508 performs a secret-sharing operation of a secret-sharing scheme effective to split the input into a same number of input shares as the different physical computing devices. Note that blocks 504, 506, and 508 may be performed in different order than presented in method 500. In this case, however, input shares are determined after physical computing devices, and thus five input shares are created for the five selected physical computing devices. The number of input shares n is five (n=5), resulting in:

Input Shares $x_1,\ldots,x_n=x_1,x_2,x_3,x_4,x_5$

These five input shares are illustrated in FIG. 1 at input shares 114.

Block 510 causes the different physical computing devices to execute the multiparty computation protocol to evaluate a functionality based on the secret-sharing scheme and the function, each of the different physical computing devices having only one of the input shares. Thus, in this example five physical computing devices 110 execute multiparty computation protocol 308 effective to evaluate functionality 310 on input shares $x_1$, $x_2$, $x_3$, $x_4$, $x_5$, respectively. Multiparty computation protocol 308 and execution by physical computing devices 110 is managed by process manager 306.

Block 510 may cause these executions directly or indirectly. Thus, if performed by process manager 306, block 510 directly causes (and manages) these executions. If performed by client device 102 or trusted third party 104 when not operating with process manager 306, block 510 causes these executions indirectly, such as with a command or request sent to process manager 306.

Block 512 receives one output share from each of the different physical computing devices. In this example, process manager 306 receives five output shares, $y_1$, $y_2$, $y_3$, $y_4$, $y_5$, one from each of physical computing devices 110 illustrated in FIG. 1 (reception of output shares not shown). As noted, however, these may instead be received by client 102, either directly or from process manager 306.

Block 514 performs a recovery operation of the secret-sharing scheme to determine the output from the output shares received. Block 514 can be performed at client device 102 or by trusted third party 104.

In the ongoing example, process manager 306 receives the output shares, provides them to trusted third party 104, which then performs the recovery operation to gain output y, which trusted third party 104 then securely provides through communication network 112 to client device 102. Additional description and details concerning the recovery operation are set forth above and in the Example Implementation section below.

The preceding discussion describes methods for secure computing in multi-tenant data centers. These methods are shown as sets of blocks that specify operations performed but are not necessarily limited to the order shown for performing the operations by the respective blocks.

Aspects of these methods may be implemented in hardware (e.g., fixed logic circuitry), firmware, software, manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computing devices.

Example Implementations

Consider, by way of example and not limitation, particular example implementations of the techniques described above. This section starts with various definitions that will be relied upon later in the section. After the definitions, this section turns to example multiparty computations in real-world and ideal-world executions. Following multiparty computations, this section turns to secure delegated computation, again in real-world and ideal-world executions. The section ends with an example protocol usable by the techniques to enable secure computing in multi-tenant data centers.

Definitions

Notation. We write x←χ to represent an element x being sampled from a distribution χ, and $$x \xleftarrow{\$} X$$

to represent an element x being sampled uniformly from a set X. The output x of an algorithm $\mathcal{A}$ is denoted by x←$\mathcal{A}$. We refer to the $i^{th}$ element of a vector v as either $v_i$ or v[i]. Throughout k will refer to the security parameter. A function v: $\mathbb{N} \to \mathbb{N}$ is negligible in k if for every polynomial p(·) and sufficiently large k, v(k)<1/p(k). Let poly(k) and negl(k) denote unspecified polynomial and negligible functions in k, respectively. We write $f$(k)=poly(k) to mean that there exists a polynomial p(·) such that for all sufficiently large k, $f$(k)≤p(k), and $f$(k)=negl(k) to mean that there exists a negligible function v(·) such that for all sufficiently large k, $f$(k)≤v(k).

Multi-party functionalities. An n-party randomized functionality is a function:

$$f: \mathbb{N} \times (\{1,0\}^*)^n \times \{0,1\}^* \to \{0,1\}^*,$$

where the first input is the security parameter k, the second input is a vector of strings x, the third input is a set of random coins and the output is a vector of strings. In the context of MPC, each party $P_i$ holds an input $x_i$ and wants to receive output $y_i$, where:

$$\bar{y} \leftarrow f(k, x; r) \text{ for } r \xleftarrow{\$} \{0, 1\}^{poly(k)}.$$

Throughout this section, we will omit the security parameter and the coins and simply write $\bar{y} \to f(x)$. A functionality is deterministic if it only takes the security parameter and the strings x as inputs and it is symmetric if all parties receive the same output. It is known that any protocol for securely computing deterministic functionalities can be used to securely compute randomized functionalities, so this is not addressed in detailed herein.

Secret sharing. A threshold secret sharing scheme consists of two polynomial-time algorithms Σ=(Share, Recover) such that Share takes as input a secret x from some input space, a number of shares n∈$\mathbb{N}$ and a threshold t∈$\mathbb{N}$ and outputs n shares ($x_1, \ldots, x_n$); and Recover takes as input a set of t shares and outputs a secret x. Σ is correct if Recover returns x when it is given any subset of t shares of x. It is hiding if, given any q<t shares, no adversary can learn any partial information about the secret x. The hiding property is formalized by requiring that there exist a simulator $\mathcal{S}$ such that for all secrets x in the input space, for all n=poly(k) and all t≤n, $\mathcal{S}$ can generate n shares that are indistinguishable from "real" shares, e.g., generated using Share. Shamir secret sharing can provide an efficient instantiation of secret sharing that is information theoretically hiding, e.g., the simulator's output is distributed exactly as the real shares.

Multiparty Computation

In this section we present an ideal/real-world security definition for multiparty computation (MPC), which compares the real-world execution of a protocol for computing an n-party function $f$ to the ideal-world evaluation of $f$ by a trusted party.

In MPC dishonest players are modeled by a single adversary that is allowed to corrupt a subset of the parties. This "monolithic" adversary captures the possibility of collusion between the cheating parties. One typically distinguishes between passive corruptions, where the adversary only learns the state of the corrupted parties; and active corruptions where the adversary completely controls the party and, in particular, is not assumed to follow the protocol. Another distinction can be made as to how the adversary chooses which parties to corrupt. If the adversary must decide this before the execution of the protocol then we say that the adversary is static. On the other hand, if the adversary can decide during the execution of the protocol then we say that the adversary is adaptive.

In the setting of MPC with dishonest majorities and a malicious adversary, certain adversarial behavior cannot be prevented. In particular, dishonest workers can choose not to participate in the computation, can compute on arbitrary inputs, or abort the computation prematurely. As such we only consider security with abort.

Real-world. At the beginning of the real-world execution each player $P_i$ receives its input $x_i$, while the adversary $\mathcal{A}$ receives a set I⊂[n] of corrupted parties if the party is static and receives the security parameter if the party is dynamic. The real execution of Π between the players P=($P_1, \ldots, P_n$) and the adversary $\mathcal{A}$, denoted $REAL_{\Pi,\mathcal{A},I}^{mpc}$(k,x), consists of the outputs of the honest players and the outputs of $\mathcal{A}$ (which can be arbitrary functions of their views).

Ideal-world. In the ideal execution the parties interact with a trusted third party that evaluates $f$. As in the real-world execution, the ideal-world execution begins with each player receiving its input $x_i$ and the adversary receiving the set of corrupted parties I. The honest parties send their input $x_i$ to the trusted party while the corrupted parties send values $x_i$ if $\mathcal{A}$ is semi-honest and arbitrary values $x_i$ is $\mathcal{A}$ is malicious.

Output delivery works as follows. If any party sends ⊥, the trusted party aborts the execution and returns ⊥ to all parties. Otherwise, it computes $\bar{y} \leftarrow f(x)$ and sends $\{y_i\}_{i \in I}$ to the adversary. The adversary can then decide to abort or continue the execution. If $\mathcal{A}$ chooses to abort, the trusted party sends ⊥ to all the honest parties. If the adversary chooses to continue, the trusted party sends $y_i$ to honest party $P_i$.

The ideal evaluation of $f$ between players P=($P_1, \ldots, P_n$) and adversary $\mathcal{A}$, denoted $IDEAL_{f,\mathcal{A},I}^{mpc}$(k,x), consists of the outputs of the honest players and the outputs of $\mathcal{A}$ (which can be arbitrary functions of their views).

Security. Roughly speaking, a protocol Π that implements a function $f$ is considered secure if it emulates, in the real-world, an evaluation of $f$ in the ideal-world. This is formalized by requiring that any real-world adversary $\mathcal{A}$ can be simulated in the ideal-world evaluation. Let $f$ be a function and Π be a protocol. We say that Π t-securely computes $f$ if for all PPT adversaries $\mathcal{A}$, there exists a PPT adversary $\mathcal{S}$ such that for all I⊆[n] such that |I|≤t, $$\{REAL_{\Pi,\mathcal{A},I}^{mpc}(k, x)\}_{k \in \mathbb{N}, x \in \{0,1\}^*} \stackrel{c}{=} \{IDEAL_{f,\mathcal{S},I,\mathcal{L}}^{mpc}(k, x)\}_{k \in \mathbb{N}, x \in \{0,1\}^*}$$

If $\mathcal{A}$ is dynamic then it receives $1^k$ as input and chooses I during the execution.

Secure Delegated Computation

Secure delegation of computation allows a client (e.g., client device 102 through function manager 206) to securely outsource the evaluation of a function $f$ on a private input x to an untrusted cluster of workers. Roughly speaking, a secure delegation scheme should guarantee that (1) the workers will not learn any partial information about the client's input and output; and (2) that the function is computed correctly.

We formally capture these requirements in the ideal/real-world paradigm. Our definition is similar to the model for MPC with the exception that only one party (e.g., the client) provides inputs and receives outputs from the computation and that the adversary cannot corrupt the client. For completeness, we formally describe the model here.

Real-world. At the beginning of the real-world execution the client receives its input x while the workers have no input. If the adversary is static, it receives a set $I \subseteq [n]$ that designates the corrupted machines. If, on the other hand, $\mathcal{A}$ is dynamic then it will choose which workers to corrupt during the execution of the protocol. The real execution of $\Pi$ between the client, the workers, and the adversary $\mathcal{A}$ is denoted $\text{REAL}_{\Omega,\mathcal{A},I}^{del}(k,x)$ and consists of the output of the client, the honest workers and $\mathcal{A}$ (which can be an arbitrary function of its view).

Ideal-world. In the ideal execution the parties interact with a trusted third party that evaluates the function $f$ implemented by the outsourcing protocol $\Omega$. As in the real-world execution, the ideal-world execution begins with the client receiving its input x. Again the workers receive no input. If the adversary is static, it receives a set $I \subseteq [n]$ that designates the corrupted workers, whereas if the adversary is dynamic the adversary chooses its corruptions during the execution.

The client sends its input x to the trusted party. If the adversary is malicious, the trusted party also asks $\mathcal{A}$ if it wishes to abort the computation. If so, the trusted party returns $\perp$ to the client and halts. If not, the trusted party computes and returns $y \leftarrow f(x)$ to the client.

The ideal evaluation of $f$ between the client, the workers (e.g., some of physical computing devices 110 of FIG. 1) and the adversary, denoted $\text{IDEAL}_{f,\mathcal{S},I}^{del}(k,x)$, consists of the outputs of the client, the honest workers and the outputs of A (which can be arbitrary functions of their views).

Security. Roughly speaking, an outsourcing protocol $\Omega$ that implements a function $f$ is considered secure if it emulates, in the real-world, an evaluation of $f$ in the ideal-world. This is formalized by requiring that any real-world adversary $\mathcal{A}$ can be simulated in the ideal-world evaluation.

Thus, let $f$ be a function and $\Omega$ be a delegation protocol. We say that $\Omega$ t-securely computes $f$ if for all PPT adversaries $\mathcal{A}$, there exists a PPT adversary $\mathcal{S}$ such that for all $I \subseteq [n]$ such that $|I| \leq t$, $$\{REAL_{\Omega,\mathcal{A},I}^{del}(k,x)\}_{k \in \mathbb{N}, x \in \{0,1\}^*} \stackrel{c}{=} \{IDEAL_{f,\mathcal{S},I}^{del}(k,x)\}_{k \in \mathbb{N}, x \in \{0,1\}^*}$$

Example Protocol

We now present an example protocol $\Omega$ for secure computing in multi-tenant data centers. Our protocol makes use of an MPC protocol $\Pi$ and a secret sharing scheme $\Sigma$=(Share, Recover) and works as follows. The input x is first split into shares $(x_1, \ldots, x_n)$ and each share is sent to a worker (e.g., physical computing devices 110). The workers then execute $\Pi$ to securely evaluate a functionality $f'$ defined as follows:

$$f'((x_1,r_1), \ldots, (x_n,r_n)) = \text{Share}(f(\text{Recover}(x_1, \ldots, x_n), n; r_1 \oplus \ldots \oplus r_n)$$

The execution of $\Pi$ will result with the workers each receiving a share of the output $y=f(x)$. After receiving these shares, the workers send them to the client (or trusted third party), which proceeds to recover the output y.

Intuitively, as long as at least one worker is honest, the adversary will not learn any information about either the input or the output. The confidentiality of the input follows from the security of $\Pi$, which guarantee that the corrupted workers will not learn any information about the honest workers' first inputs (e.g., their share of x, $x_i$) and from the security of $\Sigma$, which guarantees that as long as at least one share is unknown to the adversary no information can be recovered about the secret (e.g., x). The confidentiality of the output follows from the security of $\Sigma$, which guarantees that if at least one share remains unknown to the adversary then no information can be recovered about the output. This last property holds if the randomness used to generate the shares is uniform, which is guaranteed to hold if at least one worker is honest since $r_1 \oplus \ldots \oplus r_n$ is uniformly distributed as long as at least one $r_i$ is uniformly distributed.

We formalize this intuition in the following theorem. Note that $\Omega$ inherits the security properties of the underlying MPC protocol but we only show it for security against adaptive and malicious adversaries.

Thus, if $\Pi$ is t-secure against an adaptive and malicious adversary and $\Sigma$ is a secure secret sharing scheme, then $\Omega$, as described above, is secure against an adaptive and malicious adversary that corrupts at most t workers. This is shown with a proof where $\mathcal{S}_\Pi$ and $\mathcal{S}_\Sigma$ are the simulators guaranteed to exist by the security of $\Pi$ and the hiding property of $\Sigma$, respectively, and consider the following simulator $\mathcal{S}$. $\mathcal{S}$ begins by computing $(x'_1, \ldots, x'_n) \leftarrow \mathcal{S}_\Sigma(1^k)$ and $(y'_1, \ldots, y'_n) \leftarrow \mathcal{S}_\Sigma(1^k)$. It then uses $\mathcal{S}_\Pi$ with inputs $(y'_1, \ldots, y'_n)$ to simulate an execution of $\Pi$ with $\mathcal{A}$. If at any point worker $W_i$ is corrupted, $\mathcal{S}$ sends $\mathcal{A}$ the value $x'_i$. If at any point, the simulation of $\Pi$ aborts, $\mathcal{A}'$ asks the trusted party to abort. After polynomially-many steps, $\mathcal{A}$ outputs some value which $\mathcal{S}'$ returns as its own output. We show that the output of a $\text{REAL}_{\Omega,\mathcal{A}}^{del}(k, x)$ experiment is indistinguishable from the output of a $\text{IDEAL}_{f,\mathcal{S}}^{del}(k, x)$ experiment by a sequence of games.

$\text{Game}_0$ consists of the $\text{REAL}_{\Omega,\mathcal{A}}^{del}(k)$ experiment: namely, after receiving its input x, the client sends shares $(x_1, \ldots, x_n)$ to the n workers who execute the protocol $\Pi$ on $f'((\tilde{x}_1, \tilde{r}_1), \ldots, (\tilde{x}_n, \tilde{r}_n))$, where $f'$ is as above and where $\tilde{x}_i = x_i$ and $\tilde{r}_i$ is is chosen uniformly at random if worker $W_i$ is not corrupted. If A does not abort, then each worker $W_i$ sends its output $y_i$ to the client who computes $y \leftarrow \text{Recover}(y_1, \ldots, y_n)$.

In $\text{Game}_1$ we replace the shares in $\text{Game}_0$ with $(x'_1, \ldots, x'_n)$ generated using $\mathcal{S}_{93}(1^k)$. $\text{Game}_0$ and $\text{Game}_1$ are indistinguishable, otherwise the hiding property of $\Sigma$ would be violated.

In $\text{Game}_2$ we replace the shares $(y_1, \ldots, y_n)$ in $\text{Game}_1$ with simulated shares $(y'_1, \ldots, y'_n)$ generated using $\mathcal{S}_\Sigma(1^k)$. In $\text{Game}_1$, if at least one worker is uncorrupted, $r_1 \oplus \ldots \oplus r_n$ will be uniformly distributed and therefore the shares $(y_1, \ldots, y_n)$ will be computed "correctly". It follows then that $\text{Game}_2$ and $\text{Game}_1$ are indistinguishable (since we assume at least one worker remains uncorrupted), otherwise the hiding property of $\Sigma$ would be violated.

In $\text{Game}_3$, instead of executing $\Pi$, we use $\mathcal{S}_\Pi$ with inputs $(y'_1, \ldots, y'_n)$ to simulate a protocol execution between a client, a trusted party and $\mathcal{A}$. As long as at least one worker remains uncorrupted, the security of guarantees that the two games are indistinguishable. Notice, however, that $\text{Game}_3$ is distributed exactly as a $\text{IDEAL}_{f,\mathcal{S}}^{del}(k,x)$ experiment.

Example Device

Figure 6:
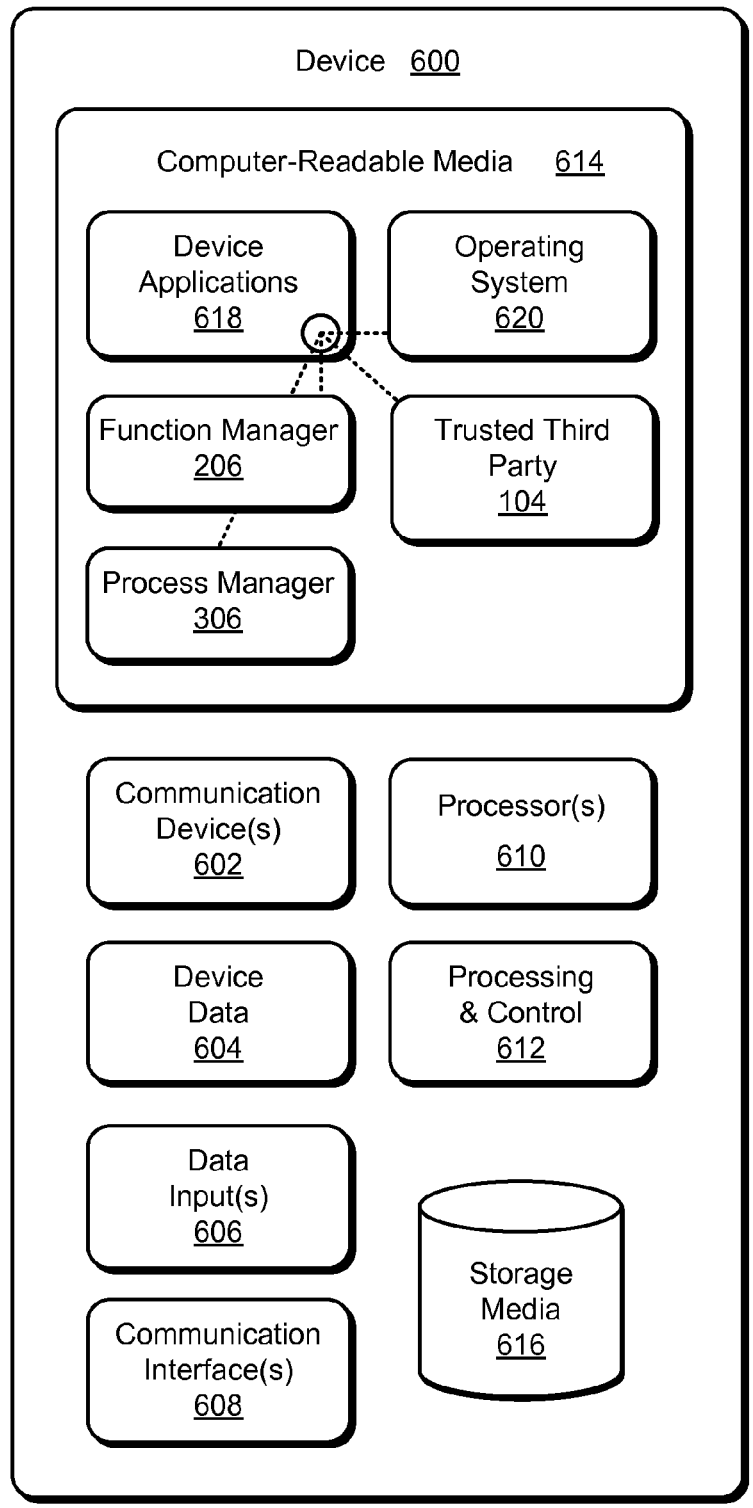
FIG. 6 illustrates an example device in which techniques for secure computing in multi-tenant data centers can be implemented.

FIG. 6 illustrates various components of example device 600 that can be implemented as any type of client, server, and/or computing device as described with reference to the previous FIGS. 1-5 to implement techniques for secure computing in multi-tenant data centers. In embodiments, device 600 can be implemented as one or a combination of a wired and/or wireless device, as a form of television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 600 may also be associated with a user (e.g., a person) and/or an entity that operates the device such that a device describes logical devices that include users, software, firmware, and/or a combination of devices.

Device 600 includes communication devices 602 that enable wired and/or wireless communication of device data 604 (e.g., received data, data that is being received, data scheduled for broadcast, data packets of the data, etc.). The device data 604 or other device content can include configuration settings of the device, media content stored on the device, and/or information associated with a user of the device. Media content stored on device 600 can include any type of audio, video, and/or image data. Device 600 includes one or more data inputs 606 via which any type of data, media content, and/or inputs can be received, such as user-selectable inputs, messages, music, television media content, recorded video content, and any other type of audio, video, and/or image data received from any content and/or data source.

Device 600 also includes communication interfaces 608, which can be implemented as any one or more of a serial and/or parallel interface, a wireless interface, any type of network interface, a modem, and as any other type of communication interface. The communication interfaces 608 provide a connection and/or communication links between device 600 and a communication network by which other electronic, computing, and communication devices communicate data with device 600.

Device 600 includes one or more processors 610 (e.g., any of microprocessors, controllers, and the like), which process various computer-executable instructions to control the operation of device 600. Alternatively or in addition, device 600 can be implemented with any one or combination of hardware, firmware, or fixed logic circuitry that is implemented in connection with processing and control circuits which are generally identified at 612. Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 600 also includes computer-readable storage media 614, such as one or more memory devices that enable persistent and/or non-transitory data storage (e.g., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 600 can also include a mass storage media device 616.

Computer-readable storage media 614 provides data storage mechanisms to store the device data 604, as well as various device applications 618 and any other types of information and/or data related to operational aspects of device 600. For example, an operating system 620 can be maintained as a computer application with the computer-readable storage media 614 and executed on processors 610. The device applications 618 may include a device manager, such as any form of a control application, software application, signal-processing and control module, code that is native to a particular device, a hardware abstraction layer for a particular device, and so on.

The device applications 618 also include any system components or modules to implement techniques for secure computing in multi-tenant data centers. In this example, the device applications 618 can include function manager 206, process manager 306, and/or trusted third party 104.

The techniques, including as shown with the example implementations above, may be embodied on one or more of the entities shown in environment 100 of FIG. 1 (and as detailed in FIGS. 2-3) and/or example device 600, which may be further divided, combined, and so on. Thus, environment 100 and/or device 600 illustrate some of many possible systems or apparatuses capable of employing the described techniques. The entities of environment 100 and/or device 600 generally represent software, firmware, hardware, whole devices or networks, or a combination thereof. In the case of a software implementation, for instance, the entities (e.g., function manager 206 of FIG. 2, process manager 306 of FIG. 3, or trusted third party 104 of FIG. 1 or 3) represent program code that performs specified tasks when executed on a processor (e.g., processor(s) 202 and 302, respectively). The program code can be stored in one or more computer-readable memory devices, such as computer-readable storage media 202, 304, or computer-readable media 614. The features and techniques described herein are platform-independent, meaning that they may be implemented on a variety of commercial computing platforms having a variety of processors.

Conclusion

Although embodiments of techniques and apparatuses for secure computing in multi-tenant data centers have been described in language specific to features and/or methods, it is to be understood that the subject of the appended claims is not necessarily limited to the specific features or methods described. Rather, the specific features and methods are disclosed as example implementations for secure computing in multi-tenant data centers.

What is claimed is:
1. A computer-implemented method comprising:
performing, through one or more computer processors, a secret-sharing operation of a secret-sharing scheme effective to split an input to a function into input shares capable of being recovered by a recovery operation of the secret-sharing scheme, the input to the function received from a client device;
causing, through one or more computer processors, the input shares to be received by different physical computing devices, one of the different physical computing devices being the client device from which the input to the function is received effective to prohibit a potentially malicious entity from operating on all of the different physical computing devices, the different physical computing devices capable of jointly executing a multiparty computation protocol effective to evaluate a functionality associated with the function and the secret-sharing scheme resulting in each of the different physical computing devices producing different output shares;
receiving, through one or more computer processors, the different output shares from the different physical computing devices; and
performing, through one or more computer processors, the recovery operation on the different output shares effective to determine an output to the function.

2. A computer-implemented method as described in claim 1, further comprising:
   receiving, at a trusted third party, the input to the function and the function from the client device; and
   providing, by the trusted third party, the output to the client device, and wherein performing the secret-sharing operation, causing the input shares to be received, receiving the different output shares, and performing the recovery operation are performed by the trusted third party.

3. A computer-implemented method as described in claim 2, wherein the trusted third party is a data center controller and one or more of the different physical computing devices are computer servers controlled by the data center controller.

4. A computer-implemented method as described in claim 1, wherein the multiparty computation protocol is also effective to prevent the malicious entity or another malicious entity having co-tenancy on one of the different physical computing devices from determining any of the input shares other than the input share received by the malicious entity or the other malicious entity.

5. A computer-implemented method as described in claim 1, wherein performing the secret-sharing operation is effective to prevent recovery of the input to the function if any one of the input shares is unknown.

6. A computer-implemented method as described in claim 1, wherein performing the secret-sharing operation is effective to prevent recovery of the output to the function if any one of the input shares or any one of the different output shares is unknown.

7. A computer-implemented method as described in claim 1, wherein one or more of the different physical computing devices are different servers in a same data center or in multiple data centers.

8. A computer-implemented method as described in claim 1, wherein the different physical computing devices are disparate personal computers.

9. A computer-implemented method as described in claim 1, wherein performing the secret-sharing operation performs two polynomial-time algorithms, the two polynomial-time algorithms effective to prevent the input from being calculated based on any subset of the input shares.

10. A computing device comprising:
    one or more computer processors; and
    one or more computer-readable storage media having instructions stored thereon that, responsive to execution by the one or more computer processors, perform operations comprising:
    receiving a function and an input to the function, the function if performed on the input resulting in an output, the input to the function received from a client device;
    determining different physical computing devices:
      on which to execute a multiparty computation protocol; and
      on all of which no potentially malicious entity is capable of operating by allocating one of the different computing devices to the client device;
    performing a secret-sharing operation of a secret-sharing scheme effective to split the input into a same number of input shares as the different physical computing devices;
    causing the different physical computing devices to execute the multiparty computation protocol to evaluate a functionality based on the secret-sharing scheme and the function, each of the different physical computing devices having only one of the input shares;
    receiving one output share from each of the different physical computing devices; and
    performing a recovery operation of the secret-sharing scheme to determine the output from said output shares.

11. A computing device as described in claim 10, the operations further comprising determining the functionality based on the secret-sharing scheme, the function, and the multiparty computation protocol.

12. A computing device as described in claim 10, wherein the different computing devices are disparate personal computers.

13. A computing device as described in claim 10, wherein one or more of the different computing devices are servers in one or more data centers.

14. A computing device as described in claim 10, wherein the different physical computing devices execute virtual machines associated with the client device from which the input is received.

15. One or more computer-readable storage media having instructions stored thereon that, responsive to execution by one or more processors, perform operations comprising:
    receiving a function;
    determining multiple computing devices on all of which no potentially malicious entity is capable of operating by setting one of the multiple computing devices as a client device from which an input to the function is received;
    determining a functionality that, responsive to evaluation by the multiple computing devices jointly performing a multiparty computation protocol and each having an input share of the input to the function, results in output shares capable of being recovered to find an output to the function;
    allocating the input shares of the input to the function to the multiple computing devices, respectively;
    receiving the output shares from the multiple computing devices; and
    performing a recovery operation on the output shares to determine the output to the function.

16. The one or more computer-readable storage media as described in claim 15, wherein the input shares are based on the input and a secret-sharing operation and the output is recovered using the secret-sharing operation.

17. The one or more computer-readable storage media as described in claim 16, wherein the secret-sharing operation is effective to prevent recovery of the input to the function if any one of the input shares is unknown.

18. The one or more computer-readable storage media as described in claim 15, wherein the recovery operation is effective to prevent recovery of the output to the function if any one of the input shares or any one of the output shares is unknown.

* * * * *